[19] United States Patent
McHugh

[11] Patent Number: 4,464,935
[45] Date of Patent: Aug. 14, 1984

[54] SHAFT VIBRATION EVALUATION

[75] Inventor: James D. McHugh, Schenectady, N.Y.

[73] Assignee: General Electric Company, Schenectady, N.Y.

[21] Appl. No.: 492,740

[22] Filed: May 9, 1983

[51] Int. Cl.³ .............................................. G01M 1/22
[52] U.S. Cl. ........................................ 73/660; 73/462; 340/682; 340/683
[58] Field of Search ................... 73/660, 462; 340/682, 340/683

[56] References Cited

U.S. PATENT DOCUMENTS 3,686,956  8/1972  Simpkin et al. ........................ 73/660
4,213,346  7/1980  Polovnikov et al. ................... 73/660
4,423,665  1/1984  Senicourt et al. ..................... 73/660

Primary Examiner—Howard A. Birmiel
Attorney, Agent, or Firm—J. C. Squillaro

[57] ABSTRACT

A shaft vibration evaluator employs measured displacement of a shaft in the vicinity of a bearing together with known or measured shaft eccentricity to calculate the dynamic bearing load so that damaging loads can be avoided. Shaft vibration or motion is assumed to be elliptical having major and minor axes which are inclined at angles with respect to the bearing displacement sensors. The magnitude of the major and minor axes and the angular displacement are calculated from the measured parameters and provide one set of inputs to the load calculator. Bearing eccentricity can be calculated from a knowledge of shaft speed, lubricant temperature and known bearing geometry. For a given eccentricity, a set of four damping coefficients and four spring coefficients of the bearing may be derived. These coefficients are the remaining inputs to the dynamic load calculator.

10 Claims, 5 Drawing Figures

SHAFT VIBRATION EVALUATION

BACKGROUND OF THE INVENTION

The present invention relates to instrumentation for rotating machinery. More particularly, the present invention relates to apparatus for monitoring and evaluating shaft vibration in terms of the ability of a bearing to withstand the vibrational motion.

A journal is that portion of a shaft which is supported by the bearings of the machinery. In a self-acting fluid film bearing, separation of the surfaces of the journal and bearing is effected by a lubricant film distributed between these surfaces by rotation of the journal. The resultant of all radial forces acting on the shaft is transmitted through this lubricant film and into the stationary structure of the apparatus through the bearings. If the resultant force exceeds the load-carrying ability of the bearing, metal-to-metal contact will occur at high relative surface speeds. This will result in catastrophic failure of the bearing and may destroy the associated apparatus.

A journal and bearing may experience both static and dynamic components of load during operation. The static component of load refers to the mean force over a large number of cycles of shaft revolution. The dynamic load refers to the rapid fluctuations of shaft radial force produced, for example, by an unbalance in the rotating shaft. The forces due to the dynamic component of load are superimposed upon the forces due to the static component of load. The time-varying dynamic forces produce alternating stresses in the bearing materials. Such alternating stresses are the primary cause of bearing metal fatigue which leads to loss of load-carrying ability in the bearing.

In the prior art, two methods have been employed to determine the severity of shaft vibrations. Seismic or accelerometer sensors have been employed casing-mounted on or near the bearings. In addition, conventional proximity probes have been employed either singly or in pairs to measure the relative motion between the bearing housing and the journal or its attached shaft.

The output of a seismic or accelerometer sensor is only indirectly related to the dynamic forces acting on the journal itself. That is, the bearing housing responds to the dynamic forces transmitted through the fluid film to the bearing housing as modified by the effective mass, stiffness and damping of the support structure. Thus, in order to determine the actual force on the journal, the result must be calibrated either through experience, test or theory to relate the level of housing vibration to the actual bearing load. Furthermore, such calibration may have to be performed on each different type of bearing housing and mounting arrangement due to the changes that these and other factors may have on the relationship between bearing housing motion and bearing load.

Measurements of shaft motion relative to the bearing housing using proximity sensors produce an ambiguous measure of bearing dynamic load. A given level of shaft vibration can correspond to a wide variety of dynamic loads. The relationship between shaft motion and dynamic load may depend on such factors as the type, size and geometry of the bearing together with its operating conditions of speed, static load and lubricant viscosity. Thus, for a given level of shaft vibration, an acceptable bearing load may be produced under certain operating conditions and an unacceptable load may be produced under another set of operating conditions.

In addition, proximity sensors as used in the prior art have produced signals related to the motion of the shaft along one axis. If this axis is not aligned with the axis of maximum displacement of the shaft, an imperfect measurement of shaft vibrational motion is produced. Shaft vibrational motion follows an elliptical path having a major and a minor axis. Thus, an arbitrarily located proximity sensor is unlikely to be aligned with the major axis and to thereby sense maximum vibratory motion. An an added complication, the axes of the ellipse may rotate under changes in conditions of shaft speed and static load. In this case, it is not possible to position a proximity sensor along an axis which is aligned with the major axis of the ellipse under all conditions.

Two proximity sensors are often employed disposed with their sensing axes 90 degrees to each other. However, in this typical arrangement, each proximity sensor still produces readings which are related only to the shaft motion along its axis and, except for temporary fortuitous orientation of the elliptical axes of shaft motion, fail to produce signals related to maximum displacement of the journal in the bearing.

The American Petroleum Institute publishes standards describing proximity probe installation requirements (API 670), allowable shaft vibration for mechanical equipment such as steam turbines (API 612), gas turbines (API 616) and gears (API 613). The information in these standards are included herein by reference.

The individual signals from a pair of proximity probes are sometimes combined by displaying them together on an instrument such as an oscilloscope. This provides a visual display of the elliptical shaft orbit for a pair of proximity probes oriented 90 degrees to each other. With such an instrument arrangement, the maximum vibratory displacement or major axis of the elliptical shaft orbit may be measured.

Even when maximum vibratory displacement is determined, however, only a partial answer to the possibility of bearing destruction is obtained. For a given bearing type and size, the magnitude of bearing dynamic force depends upon both the maximum vibratory displacement, the orientation of the elliptical orbit and the mean position of the journal relative to the bearing.

The mean position of the journal is determined by the static component of journal load. The mean journal position also establishes the dynamic bearing coefficients. These coefficients, together with the shaft vibration parameters defining the shaft orbital motion, establish the maximum force on the bearing. Conventional monitoring systems employing proximity sensors do not consider these factors and therefore are incapable of providing a measure of dynamic bearing load.

OBJECTS AND SUMMARY OF THE INVENTION

Accordingly, it is an object of the invention to provide a shaft vibration evaluator which overcomes the drawbacks of the prior art.

It is a further object of the invention to provide a shaft vibration evaluator for fluid film journal bearing shaft or journal motion along orthogonal axes to determine the parameters of an elliptical vibratory motion of the shaft or journal as well as the position of the shaft or journal due to the static component of load. Measurement of the mean journal position establishes the bearing spring and damping coefficients. From these coefficients and the parameters of motion of the vibrating shaft, the dynamic journal load can be determined and its severity evaluated.

According to an aspect of the invention there is provided a shaft vibration evaluator for evaluating dynamic loading imposed on a bearing in a fluid film journal bearing, comprising means for sensing lateral displacement of the shaft with respect to the bearing along first and second angularly spaced apart axes to produce first and second displacement signals, means responsive to the first and second displacement signals for calculating ellipse parameters of an elliptical orbit of an axis of the journal, means for calculating a set of spring and damping coefficients of the fluid film journal bearing, and means responsive to the ellipse parameters and the spring and damping coefficients of the fluid film journal bearing, and means responsive to the ellipse parameters and the spring and damping coefficients for calculating a value related to a dynamic load on the bearing.

According to a feature of the invention there is provided a method for evaluating a dynamic loading imposed on a bearing in a fluid film journal bearing comprising sensing lateral displacement of the shaft with respect to the bearing along first and second angularly spaced apart axes to produce first and second displacement signals, calculating ellipse parameters of an elliptical orbit of an axis of the journal in response to the first and second displacement signals, calculating a set of spring and damping coefficients of the fluid film journal bearing, and calculating a value related to a dynamic load on the bearing in response to the ellipse parameter and the spring and damping coefficients.

The above and other objects, features and advantages of the present invention will become apparent from the following drawings, in which like reference numerals designate the same elements.

DETAILED DESCRIPTION OF THE PREFERRED EMBODIMENT

Figure 1:
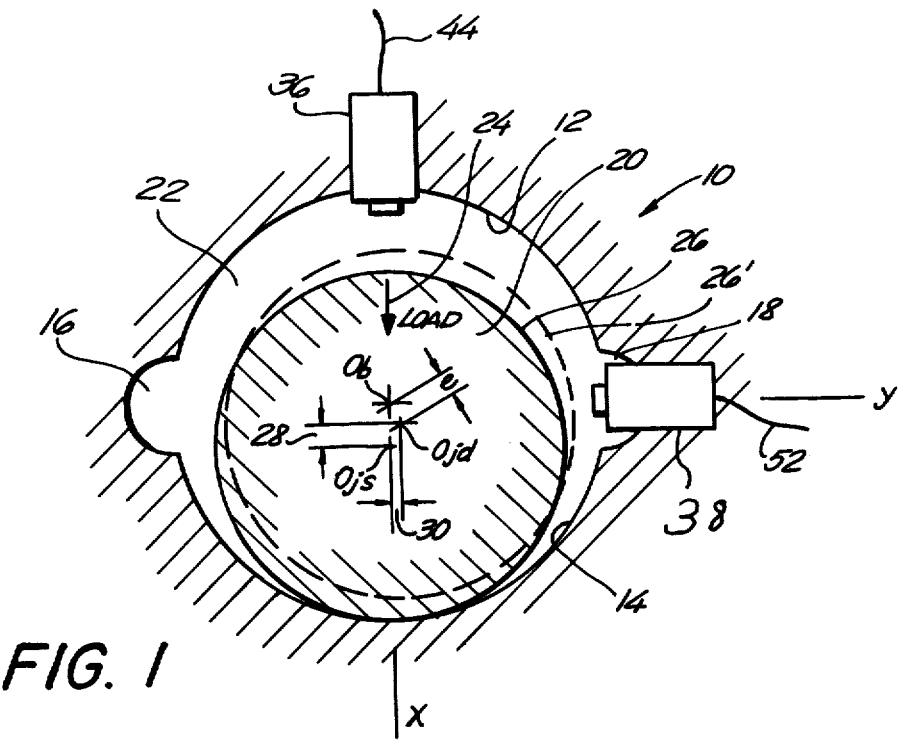
FIG. 1 is a cross sectional view of a fluid film journal bearing to which reference will be made in explaining the principle of operation of the present invention.

Referring now to FIG. 1, there is shown, generally at 10, a fluid film journal bearing wherein the clearances between the elements are exaggerated for purposes of description. Journal bearing 10 represents only one of a number of types of bearings to which the present invention may be applied. In journal bearing 10, two semicylindrical bearing surfaces 12 and 14 have a common center Ob. Lubricant feed grooves 16 and 18 are conventionally provided to permit the flow of lubricant between the surfaces of journal bearing 10. A journal 20 is positioned within bearing surfaces 12 and 14. A fluid film 22 of lubricant separates the surfaces of journal 20 and bearing surfaces 12 and 14 during rotation of journal 20. A static load 24 on journal 20 is indicated by an arrow for purposes of description.

When journal 20 is stationary, static load 24 squeezes lubricant fluid film 22 from between journal 20 and bearing surface 14 into the position of surface 26 shown in solid line wherein surface 26 directly contacts bearing surface 14. In this condition, a center Ojs of journal 20 is disposed along the direction of static load 24. When journal 20 begins to rotate, lubricant in fluid film 22 wedges between the surfaces to raise journal 20 a distance 28 against static load 24 and also to displace it a distance 30 to a new journal center Ojd so that the surface of journal 20 is repositioned to a location 26' shown in dashed line. The dynamic journal center Ojd is the position that the center of journal 20 would maintain in the absence of vibratory motion. In general, however, the center of journal 20 exhibits vibratory motion about its dynamic center Ojd.

If journal 20 were operated under zero load with zero vibration, the journal dynamic center Ojd would coincide with bearing center Ob. In this condition, a uniform total bearing ground clearance c would exist between the surface of journal 20 and bearing surfaces 12 and 14. Ground clearance c, in this condition, is equal to the difference between the radii of journal 20 and bearing surfaces 12 and 14. The presence of static load 24 displaces the dynamic center Ojd of journal 20 from its no-load position by a distance e. An eccentricity ratio $\epsilon$ is equal to e/c.

The preceding description is equally applicable to elliptical or lemon bearings, bearings with more than two lubricant feed grooves, bearings with off-set or tilting pad bearing surfaces. A full description of the geometry and mathematical development of the parameters discussed herein is given in a paper, Estimating the Severity of Shaft Vibrations within Fluid Film Journal Bearings presented at the ASME/ASLE Lubrication Conference on Oct. 5-7, 1982 in Washington, D.C. by the present inventor. The disclosure of such paper including the references cited therein is herein included by reference.

Figure 2:
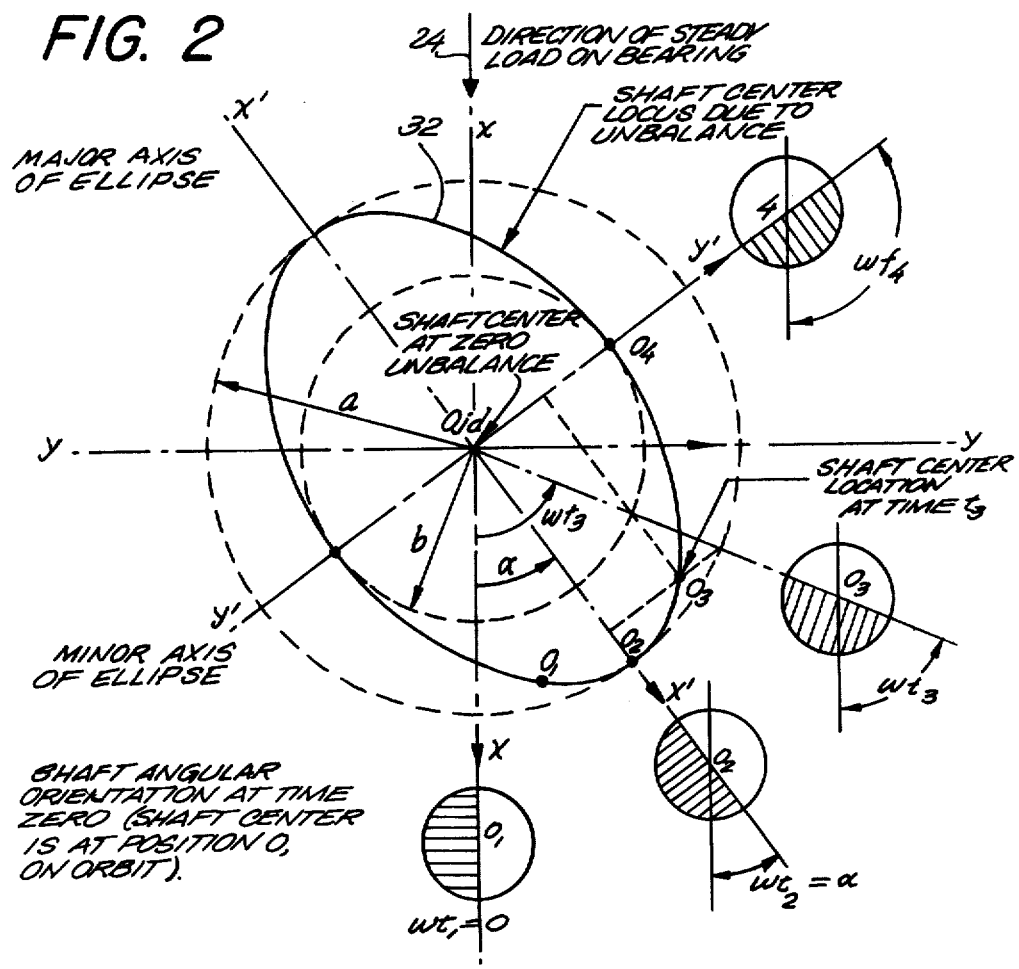
FIG. 2 is a schematic diagram identifying the axes and orbital parameters of a shaft center locus due to unbalance in the shaft or its load.

Referring now to FIG. 2, a greatly exaggerated representation of the motion of journal 20 is shown. An x axis is aligned with static load 24 and a y axis is disposed at 90 degrees thereto. At zero unbalance, the center of the journal is stationary at the journal dynamic center Ojd. In the presence of an unbalance, the center of the journal typically describes an elliptical trajectory 32 which has a major axis disposed at an angle $\alpha$ from the x axis and a minor axis b displaced an angle $\alpha$ from the y axis. For convenience, the ellipse major and minor axes are identified as rotated axes x' and y'.

For a rotation rate $\omega$, the projections of the shaft center position along the x' and y' axes are given by the following:

$x' = a \cos(\omega t - \alpha)$ $y' = b \sin(\omega t - \alpha)$

It will be clear that these values for x' and y' can be converted to values in the x, y coordinate system employing functions of a, b and $\alpha$.

Figure 3:
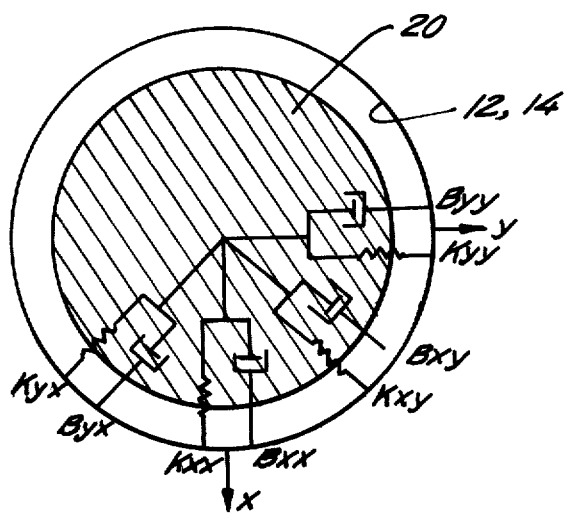
FIG. 3 is a cross section of a fluid film journal bearing to which reference will be made in describing the spring and damping coefficients employed in the present invention.

Referring now to FIG. 3, the force transmission between journal 20 and bearing surfaces 12 and 14 can be derived employing direct damping coefficients $B_{xx}$ and $B_{yy}$ and cross coupled damping coefficients $B_{yx}$ and $B_{xy}$ as well as direct spring coefficients for the fluid film $K_{xx}$ and $K_{yy}$ with cross coupled spring coefficients for the fluid film $K_{yx}$ and $K_{xy}$. The foregoing direct and cross coupled coefficients have the directions shown in FIG. 3. As noted in the foregoing referenced paper, the force exerted on the bearing in the x and y directions is as follow:

$$Fx = K_{xx}x + B_{xx}\dot{x} + K_{xy}y + B_{xy}\dot{y}$$

$$Fy = K_{yy}y + B_{yy}\dot{y} + K_{yx}x + B_{yx}\dot{x}$$

Where:
Fx = force along x axis
Fy = force along y axis
$K_{xx}$, $K_{yy}$, $K_{xy}$, $K_{yx}$ = direct and cross coupled spring coefficient
$B_{xx}$, $B_{yy}$, $B_{xy}$, $B_{yx}$ = direct and cross coupled damping coefficients.

The derivation of the direct and cross coupled spring and damping coefficients are given in a paper Calculation Method and Data for the Dynamic Coefficients of Oil Lubricated Journal Bearings presented by J. W. Lund and K. K. Thompson in an ASME Spec. Publ., Topics in Fluid Film Bearing and Rotor Bearing System Design and Optimization in 1978. Since the derivation of these coefficients is well known in the art as shown by citation of a publication, such derivation will not be given herein.

The forces along the x and y axes can be combined to produce a radial force as follows:

$$F_r = (F_x^2 + F_y^2)^{\frac{1}{2}}$$

Where: $F_r$ = radial force.

As described in the ASME/ASLE paper, a resulting equation relating maximum force to the ellipse parameters is as follows:

$$\frac{2(F_r)\text{max } c}{Wa \cos 2\alpha} = (\overline{A}^2 + \overline{B}^2 + \overline{C}^2\overline{D}^2 + ((\overline{A}^2 + \overline{B}^2)^2 +$$

$$(\overline{C}^2 + \overline{D}^2) - 2(\overline{A}^2 - \overline{B}^2)(\overline{D}^2 - \overline{C}^2) + 8\overline{A}\,\overline{B}\,\overline{C}\,\overline{D})^{\frac{1}{2}})^{\frac{1}{2}}$$

Where:
$(F_r)$max = maximum radial force
w = static load 24
c = bearing ground clearance
a = ellipse major axis
α = angular displacement of ellipse axes x' and y' from coordinate axes x and y
$\overline{A}, \overline{B}, \overline{C}, \overline{D}$: dimensionless constants.

Dimensionless constants $\overline{A}, \overline{B}, \overline{C}$, and $\overline{D}$, on the right hand side of the above equation are a function of three factors:
1. The spring and damping coefficients which are a function of bearing geometry and operating conditions and, for a given bearing at a known eccentricity ratio ε, have fixed values;
2. The ratio of the major to minor axes a/b of the ellipse; and
3. The angular displacement α of the ellipse axes.

The left side of the foregoing equation contains the known quantities: bearing ground clearance c, static load W, ellipse major axis a, and angular displacement of ellipse axes α. Thus, if a maximum radial force $(F_r)$max can be specified then the maximum vibrational amplitude represented by the ellipse major axis a may be specified for the related bearing ground clearance c and ellipse angular displacement α.

Although the invention should not be considered limited by the following parameters, it may be noted that a practical vibration trip level may be reached when shaft vibration exceeds about thirty percent of the bearing ground clearance c. For a cylindrical bearing of FIG. 1, a representative ground clearance c may be from about 0.0015 to about 0.003 times the journal diameter. For purposes of calculation, it is assumed that the ground clearance is 0.0025 and the thirty percent factor is applied. Thus, the peak-to-peak shaft vibration along the major axis a of the ellipse should be limited to about 0.00075 times the journal diameter. This rule of thumb is given for illustrative purposes only and it must be understood that such results may be modified by data from a detailed evaluation of the specific bearing type, size, static load W and operating eccentricity ratio ε.

Figure 4:
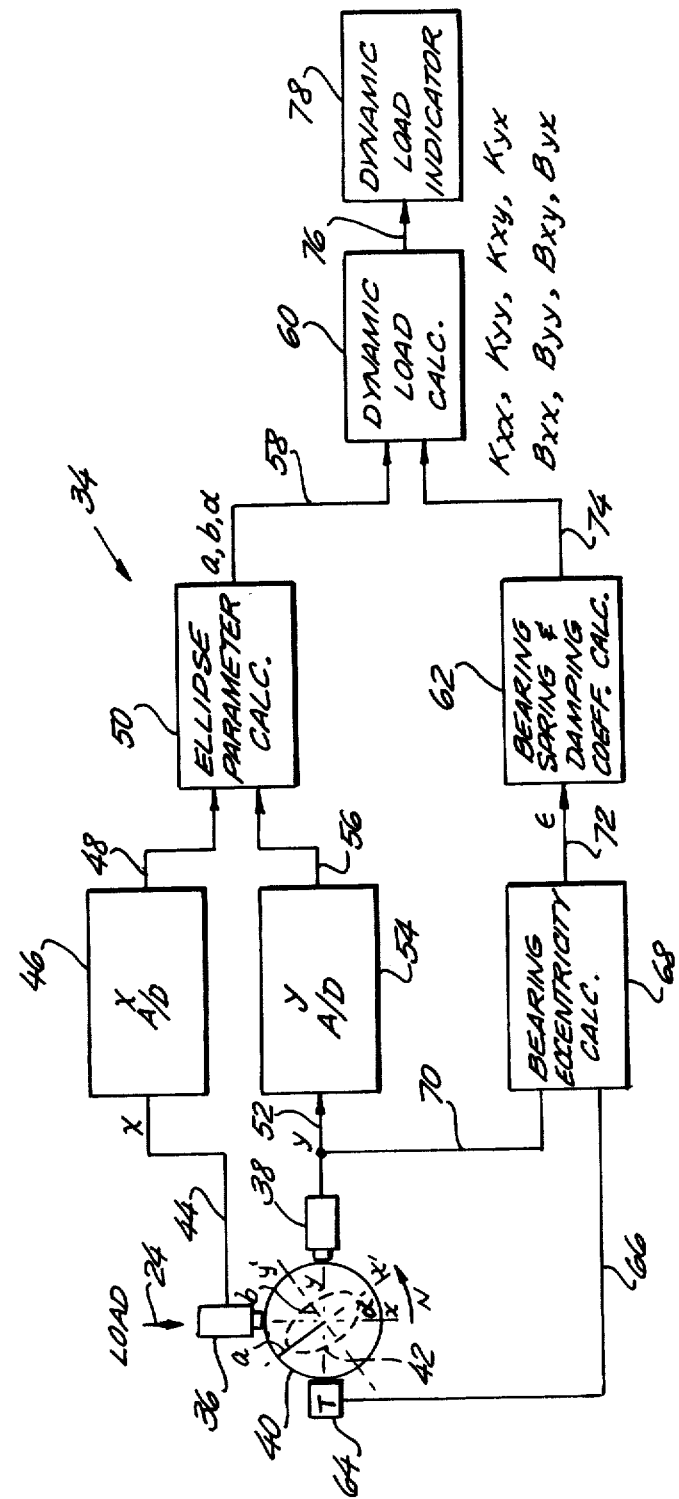
FIG. 4 is a simplified block diagram of a shaft vibration evaluator according to an embodiment of the present invention.

Referring now to FIG. 4, a shaft vibration evaluator, shown generally at 34, includes first and second proximity sensors 36 and 38 mounted on the bearing housing (not shown) adjacent a shaft 40. As noted, proximity sensor 36 is disposed along the axis of static load 24 corresponding to the x axis previously described. Similarly, proximity sensor 38 is aligned on the y axis. Proximity sensors 36 and 38 may be of any convenient type but preferably are electromagnetic devices providing analog outputs related to the distance to the surface of shaft 40. This distance changes as the center of shaft 40 describes an ellipse 42 shown in dashed line due to external or internal unbalance. An analog signal from proximity sensor 36 is applied on a line 44 to an X analog to digital converter 46 wherein the proximity of shaft 40 to proximity sensor 36 is digitized and the corresponding digital values are applied on a line 48 to an input of an ellipse parameter calculator 50. Similarly, the proximity of shaft 40 to proximity sensor 38 along the y axis is applied on a line 52 to a Y analog to digital converter 54 which produces corresponding digital values on a line 56 to a second input of ellipse parameter calculator 50.

Figure 5:
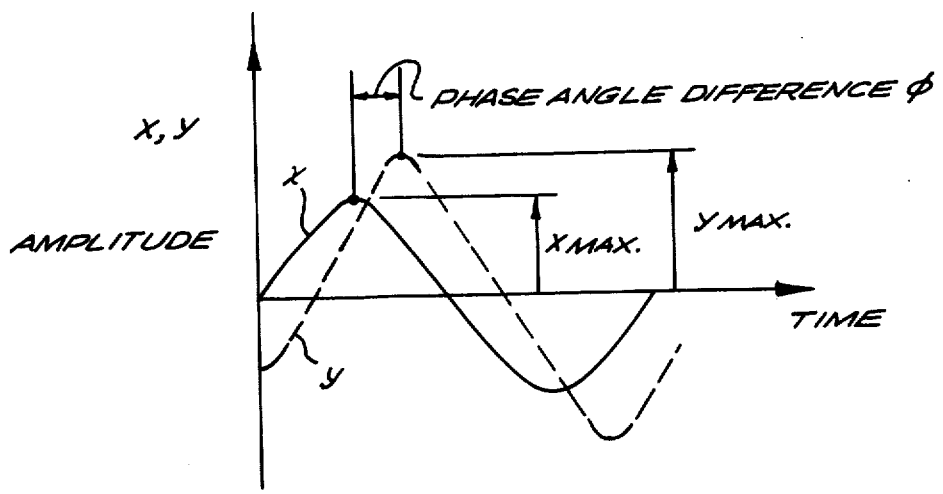
FIG. 5 is a set of curves showing the outputs of proximity sensors of FIG. 4.

Referring momentarily to FIG. 5, the x and y outputs of proximity sensors 36 and 38 are shown. It will be noted that the peak amplitudes of these signals differ and that they are displaced in time by a phase angle difference $\phi$. From a knowledge of the maximum values of x and y, Xmax and Ymax, and the phase angle difference $\phi$, coupled with a knowledge of the bearing loading and the ellipse parameters, namely the major axis dimension a, the minor axis dimension b and the angular displacement α of the ellipse axes from coordinate axes x and y can be determined by ellipse parameter calculator 50 (FIG. 4). These ellipse parameters are applied on a line 58 to an input of a dynamic load calculator 60.

A bearing spring and damping coefficient calculator 62 calculates a set of four spring coefficients and four damping coefficients based on eccentricity ratio ε and the known parameters of the journal bearing. Eccentricity ratio ε may be developed in a number of different ways, one of which is shown in FIG. 4. A temperature sensor 64 produces a signal on a line 66 related to the lubricant temperature in the bearing which is applied to a bearing eccentricity calculator 68. From the known characteristics of the lubricant being used and its temperature, the lubricant viscosity may be derived in bearing eccentricity calculator 68. In addition, a measure of shaft speed is applied on a line 70 to bearing eccentricity calculator 68. Shaft speed may be sensed in any convenient manner including electrooptical, mechanical, electrostatic or other conventional means. On the assumption that shaft 40 performs its elliptical motion at the same speed as the shaft rotates, the output from proximity sensor 36 or 38 may be employed in bearing eccentricity calculator 68 to determine the rotational speed of shaft 40. Given the speed and lubricant viscosity along with bearing ground clearance and other parameters, bearing eccentricity calculator 68 is capable of calculating eccentricity ratio ε which is applied on a line 72 to bearing spring and damping coefficient calculator 62.

Referring momentarily to FIG. 1, a further way of calculating eccentricity ratio ε is illustrated. When journal 20 is stationary, the journal static center Ojs is disposed along the load line spaced apart from the bearing axis Ob by a distance equal to the ground clearance c. As journal 20 is rotated to its running speed, the average or DC position of the journal center moves to the dynamic journal Ojd. If the oscillatory component of the outputs of proximity sensors 36 and 38 are filtered to leave the remaining DC or mean component, the raise distance 28 and displacement distance 30 become known. Thus, the mean position of the journal dynamic center Ojd is also known. From this and the known of the bearing center Ob, the radial distance e from the bearing center to the mean dynamic journal center can be calculated. Since eccentricity ratio $\epsilon = e/c$, and ground clearance c is known, the value of bearing eccentricity ratio ε is known. Other means for calculating or deriving eccentricity ratio ε may be employed without departing from the spirit of the present invention.

The spring and damping coefficients are applied on a line 74 to a second input of dynamic load calculator 60. Dynamic load calculator 60 performs the computations previously described to produce a measure of the dynamic load applied by the journal to the bearing surface and applies the resulting value on a line 76 to a dynamic load indicator 78. The measure of dynamic load on line 76 may be of any convenient type such as, for example, pressure, force, the ratio of load to a load limit or any other useful dynamic load parameter which may aid the operator of the system in evaluating the effect of the dynamic load on the system. For a further discussion of some of the ways in which the dynamic load calculation may be employed, reference may be had to the above cited paper by the present applicant. Dynamic load indicator 78 may be of any convenient analog or digital type or, alternatively, may include a storage or data transmission apparatus for local or remote storage and/or indication. For example, dynamic load indicator 78 may be an analog pointer-type indicator which indicates, for example, the percentage of allowable dynamic load being produced at a given time.

The signal processing in FIG. 4 may be performed by any convenient apparatus including a digital processor and, in the preferred embodiment, the calculations are performed by a microprocessor supported with appropriate conventional input and output signal conditioning devices.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A shaft vibration evaluator for evaluating dynamic loading imposed on a bearing in a fluid film journal bearing, comprising:
   means for sensing lateral displacement of said shaft with respect to said bearing along first and second angularly spaced apart axes to produce first and second displacement signals;
   means responsive to said first and second displacement signals for calculating ellipse parameters of an elliptical orbit of an axis of said journal;
   means for calculating a set of spring and damping coefficients of said fluid film journal bearings; and
   means responsive to said ellipse parameters and said spring and damping coefficients for calculating a value related to a dynamic load on said bearing.

2. A shaft vibration sensor according to claim 1 wherein said means for sensing lateral displacement includes first and second proximity sensors.

3. A shaft vibration evaluator according to claim 2 wherein said first axis includes an axis of a static load on said shaft and said second axis is tangentially spaced 90 degrees from said first axis.

4. A shaft vibration evaluator according to claim 1 wherein said means for calculating ellipse parameters includes means for sensing first and second maxima of said first and second signals and a phase angle between said first and second maxima, said means for calculating ellipse parameters being responsive to said first and second maxima and said phase angle to calculate a major axis, a minor axis and an angular displacement of at least one of said major and minor axes from said first and second angularly spaced apart axes.

5. A shaft vibration evaluator according to claim 1 wherein said means for calculating a set of spring and damping coefficients includes means for calculating an eccentricity ratio and means responsive to said eccentricity ratio for calculating said coefficients.

6. A shaft vibration evaluator according to claim 5 wherein said means for calculating an eccentricity ratio includes means for sensing a speed of said shaft and means for sensing a temperature of a lubricant in said bearing.

7. A shaft vibration evaluator according to claim 6 wherein said means for sensing a speed is responsive to at least one of said first and second displacement signals.

8. A shaft vibration evaluator according to claim 5 wherein said means for calculating an eccentricity includes means for sensing a mean lift and a displacement of said journal during starting of said shaft whereby a mean center of said ellipse is determined.

9. A shaft vibration evaluator according to claim 1 wherein said means for calculating a value related to a dynamic load includes means for calculating a ratio of a dynamic load to a maximum permitted load.

10. A method for evaluating a dynamic loading imposed on a bearing in a fluid film journal bearing comprising:
   sensing lateral displacement of said shaft with respect to said bearing along first and second angularly spaced apart axes to produce first and second displacement signals;
   calculating ellipse parameters of an elliptical orbit of an axis of said journal in response to said first and second displacement signals;
   calculating a set of spring and damping coefficients of said fluid film journal bearing; and
   calculating a value related to a dynamic load on said bearing in response to said ellipse parameter and said spring and damping coefficients.

* * * * *